US009893845B2

(12) United States Patent
Zhang et al.

(10) Patent No.: US 9,893,845 B2
(45) Date of Patent: *Feb. 13, 2018

(54) METHOD FOR TRANSMITTING UPLINK RESPONSE SIGNALS, BASE STATION, MOBILE STATION AND COMMUNICATION SYSTEM

(71) Applicant: FUJITSU LIMITED, Kawasaki-shi, Kanagawa (JP)

(72) Inventors: Yuantao Zhang, Beijing (CN); Yi Zhang, Beijing (CN); Yuanrong Lan, Beijing (CN); Hua Zhou, Beijing (CN); Jianming Wu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/387,169

(22) Filed: Dec. 21, 2016

(65) Prior Publication Data

US 2017/0104558 A1 Apr. 13, 2017

Related U.S. Application Data

(63) Continuation of application No. 14/942,123, filed on Nov. 16, 2015, now Pat. No. 9,538,522, which is a
(Continued)

(51) Int. Cl.
*H04L 1/18* (2006.01)
*H04W 72/04* (2009.01)
(Continued)

(52) U.S. Cl.
CPC ............ *H04L 1/1861* (2013.01); *H04L 5/001* (2013.01); *H04L 5/0044* (2013.01);
(Continued)

(58) Field of Classification Search
None
See application file for complete search history.

(56) References Cited

U.S. PATENT DOCUMENTS 9,036,562 B2 * 5/2015 Kwon ................... H04L 1/1607
370/328
9,191,935 B2 * 11/2015 Yang ..................... H04L 1/1812
(Continued)

FOREIGN PATENT DOCUMENTS

CN 101588226 A 11/2009
CN 101594211 A 12/2009
(Continued)

OTHER PUBLICATIONS

Examination Report issued for corresponding European Patent Application No. 10857430.2, dated Mar. 13, 2017.
(Continued)

*Primary Examiner* — Hong Cho
(74) *Attorney, Agent, or Firm* — Myers Wolin, LLC (57) ABSTRACT

A user equipment (UE), including: a receiver configured to receive downlink data transmitted by a base station via downlink component carriers including a secondary component carrier; and a circuit configured to select uplink resources from available resources for transmitting response signals obtained by decoding the received downlink data and select corresponding modulation symbols by using a mapping relation between a state of the response signals and the selected resources and the modulation symbols according to the state of the response signals; wherein the available resources include resources corresponding to a primary component carrier and resources allocated to the secondary component carrier by the base station; and, wherein the mapping relation includes cases in which the resource corresponding to the response signal that is NACK/DTX is not selected; where NACK represents Negative Acknowl-
(Continued)

edgement, and DTX represents Discontinuous Transmission; and when the response signals are all DTX, no resource is selected.

2 Claims, 6 Drawing Sheets

Related U.S. Application Data continuation of application No. 13/847,639, filed on Mar. 20, 2013, now Pat. No. 9,232,508, which is a continuation of application No. PCT/CN2010/077150, filed on Sep. 20, 2010.

(51) Int. Cl.
| | | |
|---|---|---|
| H04W 72/12 | (2009.01) | |
| H04L 5/00 | (2006.01) | |
| H04W 76/04 | (2009.01) | |
| H04L 5/14 | (2006.01) | |

(52) U.S. Cl.
CPC .......... *H04L 5/0053* (2013.01); *H04L 5/0055* (2013.01); *H04W 72/042* (2013.01); *H04W 72/0413* (2013.01); *H04W 72/0453* (2013.01); *H04W 72/1289* (2013.01); *H04W 76/048* (2013.01); *H04L 5/1469* (2013.01)

(56) References Cited

U.S. PATENT DOCUMENTS

| | | | | |
|---|---|---|---|---|
| 2005/0195732 A1* | 9/2005 | Huh | ............... | H04L 1/1607 370/206 |
| 2010/0215011 A1* | 8/2010 | Pan | ............... | H04L 5/0064 370/329 |
| 2011/0268001 A1* | 11/2011 | Lee | ............... | H04L 5/0005 370/311 |
| 2012/0008585 A1* | 1/2012 | Kwon | ............... | H04L 1/1614 370/329 |
| 2012/0039275 A1* | 2/2012 | Chen | ............... | H04L 1/1607 370/329 |
| 2012/0063400 A1* | 3/2012 | Papasakellariou | .... | H04L 1/1607 370/329 |
| 2013/0336262 A1* | 12/2013 | Yang | ............... | H04L 1/1812 370/329 |
| 2014/0293932 A1* | 10/2014 | Papasakellariou | .... | H04L 1/0031 370/329 |

FOREIGN PATENT DOCUMENTS

| | | |
|---|---|---|
| CN | 101742672 A | 6/2010 |
| CN | 101800991 A | 8/2010 |
| CN | 101808364 A | 8/2010 |
| EP | 1 077 576 A1 | 2/2001 |
| JP | 2001-112067 A | 4/2001 |
| JP | 2012-514440 A | 6/2012 |
| WO | 2010/050371 A1 | 5/2010 |
| WO | 2010/050688 A2 | 5/2010 |
| WO | 2010/078425 A1 | 7/2010 |
| WO | 2010/099271 A2 | 9/2010 |
| WO | 2010/104352 A2 | 9/2010 |
| WO | 2011/122837 A2 | 10/2011 |
| WO | 2012/024141 A1 | 2/2012 |

OTHER PUBLICATIONS

International Search Report issued for corresponding International Patent Application No. PCT/CN2010/077150, dated Jun. 30, 2011, with an English translation.
First Notification of Office Action issued for corresponding Chinese Patent Application No. 201080068507.0, dated Feb. 17, 2015, with an English translation.
Non-Final Rejection issued for corresponding Japanese Patent Application No. 2013-528491, dated Apr. 8, 2014, with an English translation.
Notice of Preliminary Rejection issued for corresponding Korean Patent Application No. 10-2013-7010052, dated Apr. 14, 2014, with an English translation.
Final Rejection issued for corresponding Japanese patent application No. 2013-528491, dated Nov. 25, 2014, with an English translation.
Non-Final Office Action issued by the United States Patent & Trademark Office dated Oct. 8, 2014 for corresponding co-pending patent U.S. Appl. No. 13/847,639.
Final Office Action issued by the United States Patent & Trademark Office dated Mar. 10, 2015, for corresponding co-pending U.S. Appl. No. 13/847,639.
Notice of Reason for Rejection issued by the Japan Patent Office for corresponding Japanese Patent Application No. 2015-202973, dated Aug. 23, 2016, with an English translation.
Huawei, "Resource allocation for uplink ACK/NACK multiplexing", Agenda Item: 6.2.2.3, 3GPP TSG-RAN WG1 Meeting #62, R1-104282, Madrid, Spain, Aug. 23-27, 2010.
Notice of Reason for Rejection issued by the Japan Patent Office for corresponding Japanese Patent Application No. 2015-202979, dated Aug. 23, 2016, with an English translation.
Extended European search report with supplementary European search report and the European search opinion issued by the European Patent Office for corresponding European Patent Application No. 10857430.2, dated Nov. 24, 2015.
LG Electronics, "UL control channel design to support carrier aggregation", Agenda Item: 15.4, 3GPP TSG-RAN WG1 Meeting #56bis, R1-091204, Seoul, Korea, Mar. 23-27, 2009.
Panasonic, "Support of UL ACK/NACK channel selection for carrier aggregation", Agenda Item: 7.1.4 PUCCH, 3GPP TSG-RAN WG1 Meeting #60, R1-101253, San Francisco, USA, Feb. 22-26, 2010.
Texas Instruments, "Resource Allocation for A/N Transmission on PUCCH", Agenda Item: 6.2.2.3, 3GPP TSG-RAN WG1 Meeting #62, R1-104466, Madrid, Spain, Aug. 23-27, 2010.
ZTE, "ACK/NACK Design for LTE-Advanced", Agenda Item: 7.2.3, 3GPP TSG-RAN WG1 Meeting #58bis, R1-093821, Miyazaki, Japan, Oct. 12-16, 2009.
Non-Final Office Action issued by the United States Patent and Trademark Office for corresponding U.S. Appl. No. 14/942,123, dated Aug. 30, 2016.
Office Action issued by the Canadian Intellectual Property Office for corresponding Canadian Patent Application No. 2,811,844 dated Jun. 16, 2016.
Examiner's Report and Examination Search Report issued for corresponding Canadian Patent Application No. 2811844 dated May 4, 2017.
Communication pursuant to Article 94(3) EPC issued by the European Patent Office for corresponding European Patent Application No. 10857430.2, dated Sep. 26, 2017.

* cited by examiner

METHOD FOR TRANSMITTING UPLINK RESPONSE SIGNALS, BASE STATION, MOBILE STATION AND COMMUNICATION SYSTEM

CROSS-REFERENCE TO RELATED APPLICATIONS

The present application is a continuation of U.S. application Ser. No. 14/942,123, filed Nov. 16, 2015, which is a continuation of U.S. application Ser. No. 13/847,639, filed Mar. 20, 2013, now U.S. Pat. No. 9,232,508 which issued Jan. 5, 2016, which is a continuation of PCT Application No. PCT/CN2010/077150, filed on Sep. 20, 2010, the contents of each are herein wholly incorporated by reference.

Technical Field

The present invention relates to the field of wireless communication, and in particular to a method for transmitting uplink response signals, base station, mobile station and communication system.

Background Art

In a long-term evolution (LTE) system, a user equipment (UE) receives downlink data transmitted by a base station, decodes the downlink data and obtains a response signal of the downlink data based on the decoding result, then transmits uplink control information containing the response signal in a physical uplink control channel (PUCCH), so that the base station can judge whether the data transmission is correct or wrong according to the uplink control information and hence judge whether data retransmission is needed. Wherein, the uplink control information comprises response signals for downlink data, such as acknowledgement (ACK)/negative acknowledgement (NACK)/discontinuous transmission (DTX), and channel state information (CSI), etc., wherein the ACK denotes that the data are correctly received, NACK denotes that the data are wrongly received, and DTX denotes that the UE receives no downlink control data, that is, receives no control signaling for scheduling downlink data transmission.

Figure 1:
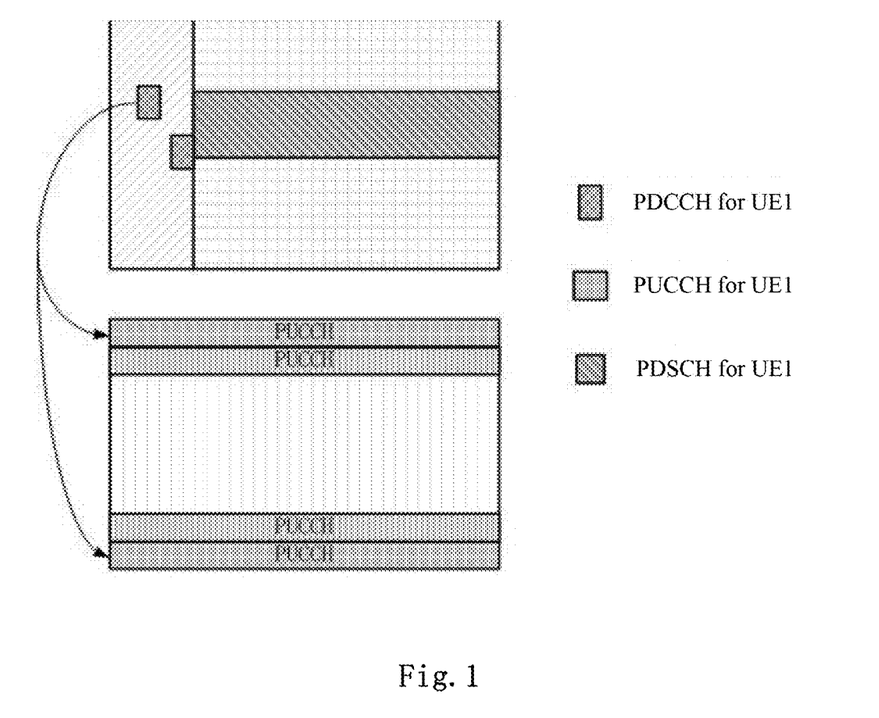
FIG. 1 is a schematic diagram of the mapping of the uplink and downlink control channels of an LTE system.

The response signals transmitted in the PUCCH correspond respectively to a physical channel resource, a time domain sequence and a frequency domain sequence, these three resources being associated with two parameters. One parameter is parameter N1 configured by a high layer of the system and is the same for all the UEs in all cells, and the other parameter is associated with an index of a first control channel element (CCE) contained in a physical downlink control channel (PDCCH) used for scheduling the downlink data to which the response signals correspond. In particular, N1 determines a starting position of the PUCCH used for transmitting the response signals, in the frequency domain in an uplink subframe, and this parameter is shared by all the UE or mobile stations in the cells; and the index of the first CCE of the PDCCH, together with the starting position, determine the physical resources and sequence resources actually used by the UE scheduled in the PDCCH in transmitting uplink control signaling, as shown in FIG. 1.

Figure 2:
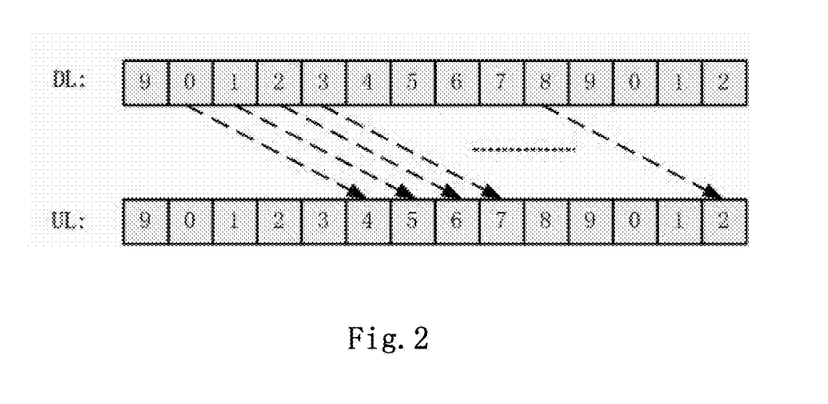
FIG. 2 is a schematic diagram of the timing sequence of response signal transmission of an LTE FDD system.

FIG. 2 is a schematic diagram of the timing sequence of response signal transmission of an LTE FDD (frequency division duplexing) system. For an LTE FDD system, uplink subframes correspond to downlink subframes one by one. Namely, for any one of the UE in the system, in an uplink subframe, only a response signal value of the data in a downlink subframe corresponding to the uplink subframe is transmitted. The data transmitted in a downlink subframe contains at most two transmission blocks (TBs), that means, there exist response signals with two bits. The response signals with two bits need to be modulated into QPSK (quadrature phase shift keying) symbols before transmission, and then are mapped into corresponding physical resources and sequence resources. The timing sequence of ACK/NACK transmission of an LTE FDD system is as shown in FIG. 2.

Figure 3:
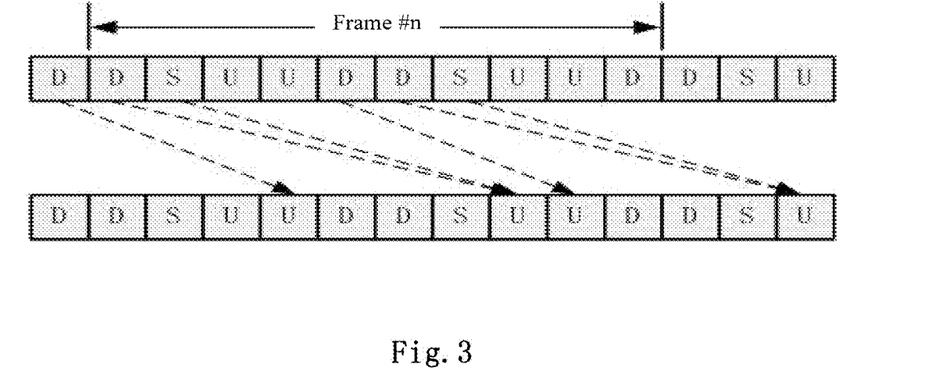
FIG. 3 is a schematic diagram of the timing sequence of response signal transmission of an LTE TDD system.

FIG. 3 is a schematic diagram of the timing sequence of response signal transmission of an LTE TDD (time division duplexing) system. In LTE TDD system, 7 types of uplink and downlink subframe configuration are defined. In most of the subframe configuration, one uplink subframe corresponds to multiple downlink subframes in many cases; that is, for any one of the UE in the system, in an uplink subframe, response signal values of the data in multiple downlink subframes corresponding to the uplink subframe need to be transmitted. The timing sequence of transmission of ACK/NACK to which certain uplink and downlink subframe configuration corresponds of an LTE TDD system is as shown in FIG. 3.

Currently, a method called channel selection is used in an LTE TDD system to transmit response signals, to which the data in multiple downlink subframe correspond, in an uplink subframe. The method comprises: if two TBs are contained in the downlink subframe, bundling the response signals of the two TBs; for example, when all the response signals are ACK, the result is still ACK after bundling, otherwise, the result is NACK; and then determining modulated symbol values and corresponding physical resources and sequence resources by looking up a table based on the bundled response signals.

Table 1 shows a response signal feedback method when two downlink subframes correspond to one uplink subframe. As shown in Table 1, if the response signals detected by the UE in the two subframes are (ACK, ACK), the lowest CCE index n1 of the PDCCH used for scheduling the UE to perform downlink signal transmission, in the first subframe is chosen for uplink physical resources and sequence resources mapping, with a value of modulation symbol being −1, and if the response signals to which the two subframes correspond are (ACK, NACK/DTX), the lowest CCE index n0 of the PDCCH in the 0th subframe is chosen for uplink physical resources and sequence resources mapping, with a value of modulation symbol being j, and other channel selection schemes may be deducted by analogy according to Table 1. In general, the number of resources needed in channel selection is equal to the number of bits of the response signals; for example, if the numbers of the response signals are 2, 3 or 4 bits, 2, 3 or 4 resources are needed respectively.

TABLE 1

A channel selection scheme for response signals with 2 bits in an LTE system

| Response signal 1, Response signal 2 | Resources | b(0), b(1) |
|---|---|---|
| ACK, ACK | n1 | −1 |
| ACK, NACK/DTX | n0 | −j |
| NACK/DTX, ACK | n1 | 1 |
| NACK/DTX, NACK | n1 | j |
| NACK, DTX | n0 | j |
| DTX, DTX | N/A | N/A |

It can be seen from above that in an LTE TDD system, as bundling of response signals is used, an available resource may be obtained from each downlink subframe containing data transmission. Hence, the resources are sufficient when the response signals values fed back are mapped to the resources.

In an LTE-advanced (LTE-A) system, carrier aggregation (CA) is used in data transmission, in which the uplink and downlink containing multiple component carriers (CC), and uplink data transmission and downlink data transmission may be scheduled in each component carrier for a mobile station in the system. The system configures each UE with a downlink primary component carrier (PCC) and multiple secondary component carriers (SCCs). The data transmitted in the PCC and SCCs is scheduled respectively.

In the LTE-A system, for any UE, control information, such as response signals of the data of each downlink component carrier and channel state information (CSI) of the downlink component carrier, etc., to which all the configured downlink SCCs of the UE correspond, is fed back in the uplink PCC of the UE. This is similar to the LTE TDD, that is, the mobile station needs to feed back response signals values of the data in multiple downlink subframes in an uplink subframe of one PCC, the downlink subframes belonging to different downlink component carriers (CCs).

However, in the implementation of the present invention, the inventor found following defects existing in the prior art of an LTE-A system, when carrier aggregation scheme is adopted, as resources to which a PCC corresponds are pre-configured, when a base station transmits data by using SCCs, a case of insufficient resources exists because bundling is not adopted in accordance with the requirement of a single carrier.

For example, when a mobile station is configured with 2 CCs, that is, a PCC and a PCC, and 2 TBs are transmitted in each of the CCs, 4 response signals values are needed to be fed back and 4 resources are needed for selection; while in a general case, resources to which a PCC corresponds are normally pre-configured, in this case, if mapping is performed by using only the lowest CCE index of the PDCCH in each CC, the number of the available resources is only 2.

There is no effective solution for the case of resources insufficient till now.

Following documents are listed for the easy understanding of the present invention and conventional technologies, which are incorporated herein by reference as they are fully stated in this text.

1) CN101594211A, published in Dec. 2, 2009, and entitled Method for sending correct/wrong response message in multicarrier system with big bandwidth;

2) CN101588226A, published in Nov. 25, 2009, and entitled Terminal in large bandwidth multi-carrier system and a sending method of response message; and 3) WO2010/050688A2, entitled Method of HARQ acknowledgement transmission and transport block retransmission in a wireless communication system.

SUMMARY OF THE INVENTION

An object of the embodiment of the present invention is to provide a method for transmitting uplink response signals, base station, mobile station and communication system, wherein, the base station allocates extra resource, such that UE feeds back response signals by using preconfigured resources and the extra allocated resources, feeding back the response signals at a relatively low cost, and solving the problem of insufficient resources in the prior art.

According to an aspect of the embodiments of the present invention, there is provided a method for transmitting uplink response signals, comprising:

judging whether to use a downlink secondary component carrier to transmit data to a mobile station;

if the judging result is positive, allocating resources according to the number of transmission blocks for transmitting the downlink data in the secondary component carrier, such that the mobile station is able to use the resources corresponding to a preconfigured primary component carrier and the resources allocated to the secondary component carrier to select uplink resources for transmitting response signals.

According to another aspect of the embodiments of the present invention, there is provided a method for transmitting uplink response signals, comprising:

receiving the downlink data transmitted by a base station via a downlink component carrier;

decoding the received downlink data, and obtaining response signals of the downlink data according to the decoding result;

selecting uplink resources for transmitting the response signals from available resources and selecting corresponding modulation symbols if the component carrier for transmitting the downlink data includes a secondary component carrier; wherein the available resources include resources corresponding to a preconfigured primary component carrier and the resources allocated to the secondary component carrier by the base station; and transmitting the response signals by using the selected uplink resources and the corresponding modulation symbols.

According to still another aspect of the embodiments of the present invention, there is provided a base station, comprising:

a judging unit configured to judge whether a downlink secondary component carrier is used to transmit data to a mobile station;

a resource allocating unit configured to allocate resources according to the number of the transmission blocks for transmitting downlink data via the secondary component carrier if the judging result of the judging unit is positive, such that the mobile station is able to use the resources corresponding to a preconfigured primary component carrier and the resources allocated to the secondary component carrier to select the uplink resources for transmitting response signals.

According to a further aspect of the embodiments of the present invention, there is provided a mobile station, comprising:

a data receiving unit configured to receive the downlink data transmitted by a base station via a downlink component carrier;

a data processing unit configured to decode the received downlink data, and obtain the response signals of the downlink data according to the decoding result;

a first resource selecting unit configured to select the uplink resources for transmitting the response signals from available resources and select corresponding modulation symbols, if the component carrier for transmitting the downlink data includes a secondary component carrier; wherein the available resources include resources corresponding to a preconfigured primary component carrier and the resources allocated to the secondary component carrier by the base station; and a signal transmitting unit configured to transmit the response signals by using the selected uplink resources and the corresponding modulation symbols.

According to a further still aspect of the embodiments of the present invention, there is provided a communication system, comprising:

a base station, comprising the above-described base station; and a mobile station, comprising the above-described mobile station.

According to a further still aspect of the embodiments of the present invention, there is provided a computer-readable program, wherein when the program is executed in a base station, the program enables a computer to carry out the above-described method for transmitting uplink response signals in the base station.

According to a further still aspect of the embodiments of the present invention, there is provided a storage medium storing a computer-readable program, wherein the computer-readable program enables a computer to carry out the above-described method for transmitting uplink response signals in a base station.

According to a further still aspect of the embodiments of the present invention, there is provided a computer-readable program, wherein when the program is executed in a mobile station, the program makes a computer to carry out the above-described method for transmitting uplink response signals in the mobile station.

According to a further still aspect of the embodiments of the present invention, there is provided a storage medium storing a computer-readable program, wherein the computer-readable program enables a computer to carry out the above-described method for transmitting uplink response signals in a mobile station.

The advantages of the present invention exist in that, by allocating extra resource by the base station, the UE may feed back response signals by using preconfigured resources and the extra allocated resources, and may feed back the response signals at a relatively low cost which solves the problem of insufficient resources in the prior art.

These and further aspects and features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF THE INVENTION

The embodiments of the present invention are described as follows with reference to the drawings. These embodiments are illustrative only, and are intended to limit the present invention. For easy understanding of the principle and embodiments of the present invention by those skilled in the art, the embodiments of the present invention shall be described taking an LTE-A system of 3GPP using CA scheme for transmitting data as an example. However, it should be understood the present invention is not limited to the LTE-A system, and is also applicable similar multicarrier communication systems having a CA function.

Figure 4:
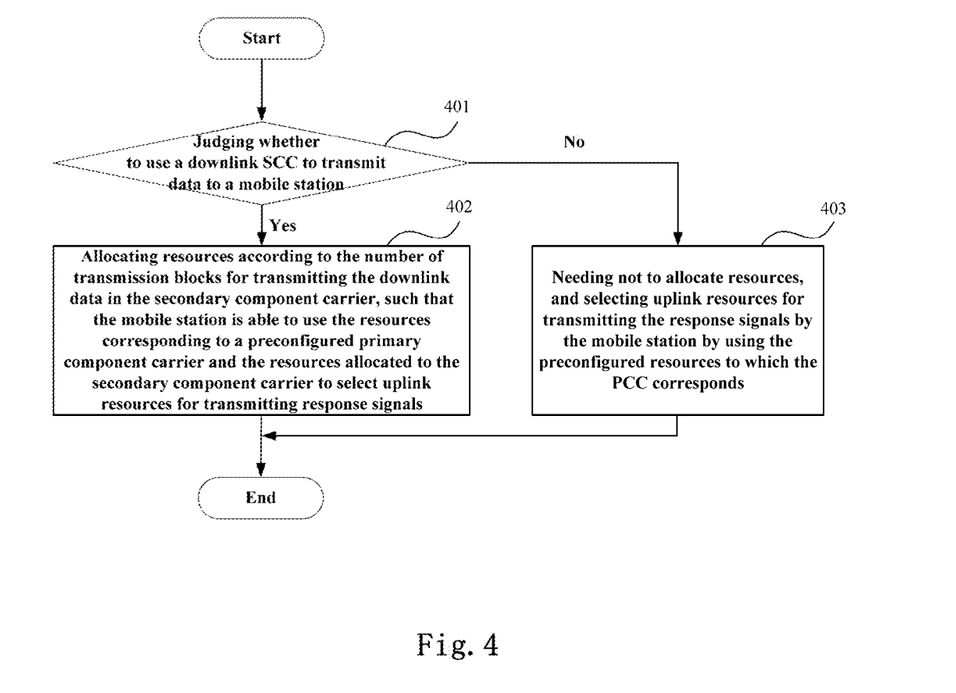
FIG. 4 is a flowchart of the method for transmitting uplink response signals in accordance with the 1st embodiment of the present invention.

FIG. 4 is a flowchart of the method for transmitting uplink response signals of the first embodiment of the present invention. As shown in FIG. 4, the method comprises:

Step 401: judging whether to use a downlink SCC to transmit data to a mobile station when a base station transmits data to the mobile station; and if the judging result is positive, performing step 402; otherwise, performing step 403;

Step 402: if the judging result in step 401 is positive, allocating resources according to the number of transmission blocks for transmitting the downlink data in the secondary component carrier, such that the mobile station is able to use the resources corresponding to a preconfigured primary component carrier and the resources allocated to the secondary component carrier to select uplink resources for transmitting response signals.

In this embodiment, in step 401, if the base station determines to use the downlink SCC to transmit data, a case of insufficient of resources occurs; in this case, the base station may allocate resources for the SCC, such that the mobile station feeds back the response signals by using preconfigured resources and extra allocated resources.

In this embodiment, the method further comprise step 403: if the judging result in step 401 is negative, it shows that a PCC is used to transmit downlink data; as resources to which the PCC corresponds are pre-configured, no extra resource is needed to be allocated, and the mobile station may use the preconfigured resources to feed back the response signals.

It can be seen from the above embodiment that in the case of insufficient resources, the base station allocates extra resource, so that the mobile station may obtain the allocated resources and feed back response signals by using the preconfigured resources and the extra allocated resources, and may feed back the response signals at a relatively low cost without breaking the uplink single carrier properties which solves the problem of insufficient resources in the prior art.

Figure 5:
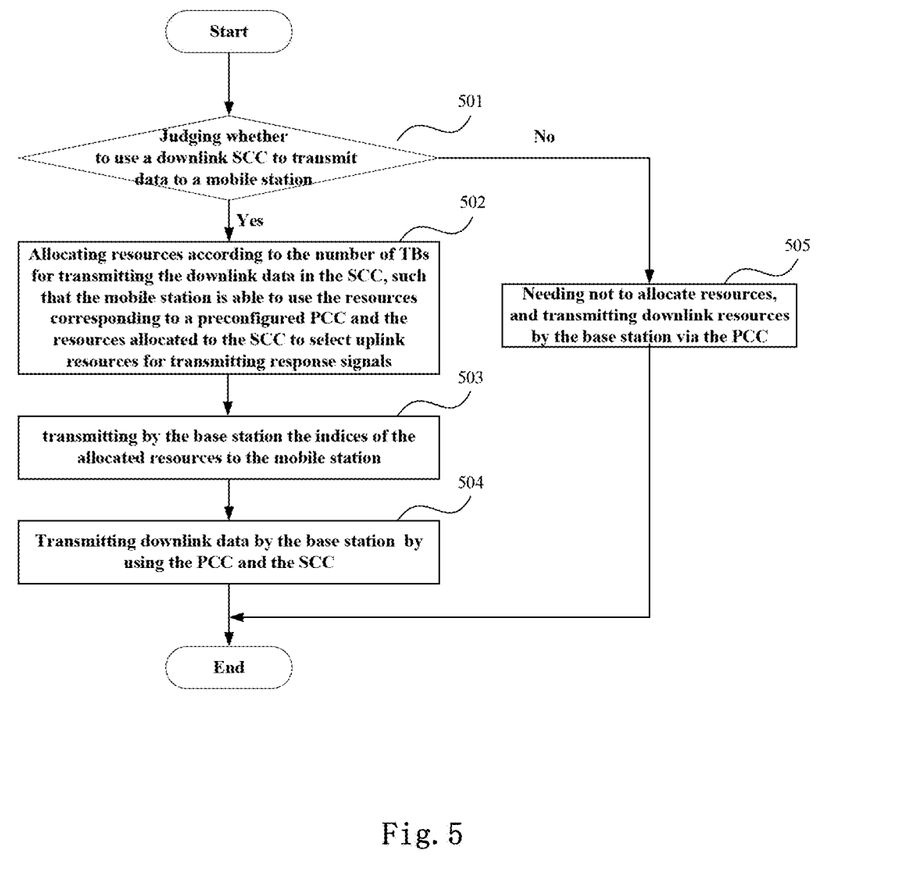
FIG. 5 is a flowchart of the method for transmitting uplink response signals in accordance with the 2nd embodiment of the present invention.

FIG. 5 is a flowchart of the method for transmitting uplink response signals in accordance with the second embodiment of the present invention. As shown in FIG. 5, the method comprises:

step 501: judging whether to use a downlink SCC to transmit data to a mobile station when a base station transmits data to the mobile station; and if the judging result is positive, performing step 502; otherwise, performing step 505;

wherein, the base station may determine whether to apply downlink SCC to transmit data to the mobile station in accordance with the channel quality signal transmitted from the mobile station, which may be carried out by using any existing manner, and shall not be described any further.

step 502: if the judging result in step 401 is positive, allocating resources according to the number of TBs for transmitting the downlink data in the SCC, such that the mobile station is able to use the resources corresponding to a preconfigured PCC and the resources allocated to the SCC to select uplink resources for transmitting response signals;

wherein the following methods may be used to allocate the resources:

method 1: if the number of TBs for transmitting the downlink data is 1, selecting resources from a preconfigured first resource table, each of the elements in the first resource table comprising 1 resource; wherein, following cases are included: the number of the configured TBs is 1; and the number of the configured TBs is 2 but the number of the TBs actually used in data transmission is 1; for example, the first resource set 1 is as shown in Table 1:

TABLE 1

| r1 | r2 | r 3 | r 4 | r5 | r6 | r 7 | r 8 |
|---|---|---|---|---|---|---|---| method 2: if the number of TBs for transmitting the downlink data is 2, selecting resources from a preconfigured second resource table, each of the elements in the second resource table comprising 2 resources for example, the second resource set 2 is as shown in Table 2:

TABLE 2

| (r1, r2) | (r3, r4) | (r5, r6) | (r7, r8) | (r8, r10) | (r11, r12) | (r13, r14) | (r15, r16) |
|---|---|---|---|---|---|---|---| step 503: transmitting the indices of the allocated resources to the mobile station;

wherein the indices of the resources may be transmitted to the mobile station via a PDCCH in the SCC scheduling the downlink data;

step 504: transmitting downlink data by the base station to the mobile station by using the PCC and the SCC, such that the mobile station decodes the downlink data after receiving the downlink data to obtain corresponding response signals, and feeds back the response signals by using the preconfigured resources and the extra allocated resources; and step 505: if the judging result in step 501 is negative, as resources to which the PCC corresponds are pre-configured, no extra resource is needed to be allocated, the PCC is used to transmit downlink data, and the mobile station may use the preconfigured resources to feed back the response signals.

It can be seen from the above embodiment that in the case of insufficient resources, the base station allocates extra resource based on the number of TBs used for transmitting data, and transmits the indices of the resources to the mobile station via a PDCCH in the SCC scheduling the downlink data, so that the mobile station may obtain the allocated resources and feed back response signals by using the preconfigured resources and the extra allocated resources, and may feed back the response signals at a relatively low cost without breaking the uplink single carrier properties which solves the problem of insufficient resources in the prior art.

Figure 6:
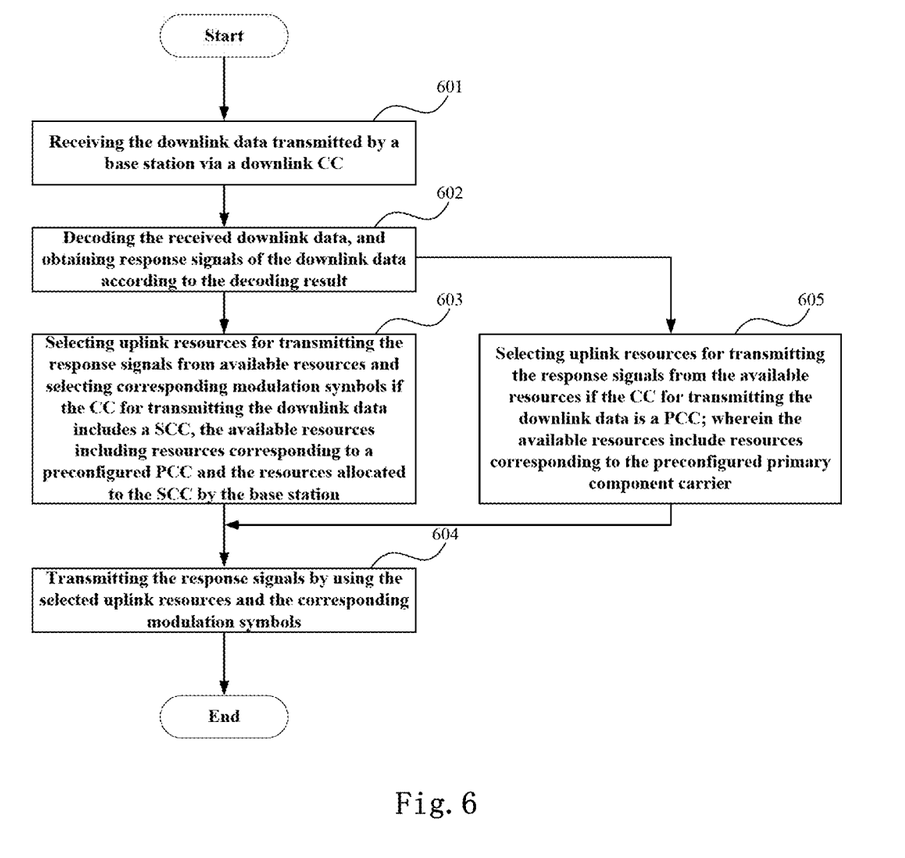
FIG. 6 is a flowchart of the method for transmitting uplink response signals in accordance with the 3rd embodiment of the present invention.

FIG. 6 is a flowchart of the method for transmitting uplink response signals in accordance with the third embodiment of the present invention. As shown in FIG. 6, the method comprises:

Step 601: receiving the downlink data transmitted by a base station via a downlink CC;

Step 602: decoding the received downlink data, and obtaining response signals of the downlink data according to the decoding result;

Step 603: selecting uplink resources for transmitting the response signals from available resources and selecting corresponding modulation symbols if the CC for transmitting the downlink data includes a SCC; wherein the available resources include resources corresponding to a preconfigured PCC and the resources allocated to the SCC by the base station; and Step 604: transmitting the response signals by using the selected uplink resources and the corresponding modulation symbols.

It can be seen from the above embodiment that in the case of insufficient resources, the base station allocates extra resource based on the number of TBs used for transmitting data, and transmits the indices of the resources to the mobile station via a PDCCH, the mobile station may feed back response signals by using the preconfigured resources and the extra allocated resources, and may feed back the response signals at a relatively low cost without breaking the uplink single carrier properties which solves the problem of insufficient resources in the prior art.

In this embodiment, in step 602, there are three types of response signals, namely, ACK, NACK and DTX; wherein ACK (hereinafter expressed as A) denotes that the data are correctly received, NACK (hereinafter expressed as N) denotes that the data are wrongly received, and DTX (hereinafter expressed as D) denotes no downlink control data is received, that is, no control signaling for scheduling downlink data transmission is received.

In this embodiment, in step 603, as the base station uses the SCC to transmit downlink data, insufficient of resources occurs; as such, the base station allocates extra resources for the SCC, such that the mobile station selects uplink resources for transmitting response signals from the preconfigured resources and the allocated resources; wherein the extra allocated resources are PUCCH resources.

In this embodiment, in step 604, the mobile station uses the selected uplink resources and the corresponding modulation symbols to transmit the response signals; wherein a QPSK modulation may be used to transmit the response signals in the selected resources.

In this embodiment, different response states are mapped by using the uplink resources and the modulation symbols in the uplink resources. In this way, the mobile station may select the uplinks resources and select corresponding modulation symbols according to the response states. Thus, the mobile station may transmit the modulation symbols, and the base station may judge whether the transmitted downlink data are correctly received after receiving the modulation symbols. This is similar to the prior art, which shall not be described any further.

In this embodiment, if the base station allocates extra resources to the SCC, the base station transmits the indices of the allocated resources to the mobile station. Therefore, the method further comprises: receiving, by the mobile station, indices of the resources allocated by the base station for the SCC and transmitted by the base station.

In this embodiment, the method further comprises step 605: selecting uplink resources for transmitting the response signals from the available resources and selecting corresponding modulation symbols if the CC for transmitting the downlink data is a PCC; wherein the available resources include resources corresponding to the preconfigured primary component carrier.

In this embodiment, in steps 603 and 605, the manner below may be used in selecting the uplink resources for transmitting the response signals by using the available resources:

selecting the uplink resources for transmitting the response signals and the modulation symbols by using a preconfigured mapping relation between the state of the response signals and the selected resources and the modulation symbols according to the state of the response signals; wherein a selected resource is one of the available resources;

wherein in the mapping relation, the resource corresponding to the response signal that is N/D is not selected; N and D are not differentiated, where N represents data is received with error, and D represents no downlink control data is received; and when the response signals are all N/D, no resource is selected.

and wherein a preconfigured mapping relations table may be looked up according a number of bits of the response signals, the number of the resources available for selection (the number of the available resources) in the mapping relations table being equal to the number of the bits of the response signals. Following description is given taking that the numbers of the response signals are 4 bits, 3 bits and 2 bits as examples.

First, the number of the response signals is 4 bits

Following cases are included when the number of the response signals is 4 bits:

1) 2 CCs are configured for the mobile station, the transmission mode configured for each of the CCs containing 2 TBs;

2) 3 CCs are configured for the mobile station, the transmission mode configured for one of the CCs containing 2 TBs, and the transmission mode configured in each of the other two CCs containing 1 TB; and 3) 4 CCs are configured for the mobile station, the transmission mode configured for each of the CCs containing 1 TB.

In these cases, the number of the resources available for selection, i.e. the number of the available resources, is 4; the relation between the state of the response signals of the mobile station and the available resources is as shown in Table 3A, in which the resources available for selection are one or more of the available resources; and for response signals with 4 bits, the mapping relation between the state of the response signals and the selected resources and the modulation symbols is as shown in Table 3B, in which the resources available for selection are one of the available resources (selectable resources).

TABLE 3A

Available resources for response signals with 4 bits

| No. | R0 | R1 | R2 | R3 | Available Resources |
|---|---|---|---|---|---|
| 1 | A | A | A | A | n0, n1, n2, n3 |
| 2 | A | A | A | N/D | n0, n1, n2 |
| 3 | A | A | N/D | A | n0, n1, n3 |
| 4 | A | A | N/D | N/D | n0, n1 |
| 5 | A | N/D | A | A | n0, n2, n3 |
| 6 | A | N/D | A | N/D | n0, n2 |
| 7 | A | N/D | N/D | A | n0, n3 |
| 8 | A | N/D | N/D | N/D | n0 |
| 9 | N/D | A | A | A | n1, n2, n3 |
| 10 | N/D | A | A | N/D | n1, n2 |
| 11 | N/D | A | N/D | A | n1, n3 |
| 12 | N/D | A | N/D | N/D | n1 |
| 13 | N/D | N/D | A | A | n2, n3 |
| 14 | N/D | N/D | A | N/D | n2 |
| 15 | N/D | N/D | N/D | A | n3 |
| 16 | N | N/D | N/D | N/D | n0 |
| 17 | D | N/D | N/D | N/D | N/A |

TABLE 3B

Mapping relation of response signals with 4 bits

| No. | R0 | R1 | R2 | R3 | Selected Resources | Modulation symbols |
|---|---|---|---|---|---|---|
| 1 | A | A | A | A | n3 | −1 |
| 2 | A | A | A | N/D | n1 | −1 |
| 3 | A | A | N/D | A | n3 | j |
| 4 | A | A | N/D | N/D | n0 | j |
| 5 | A | N/D | A | A | n2 | −1 |
| 6 | A | N/D | A | N/D | n2 | j |
| 7 | A | N/D | N/D | A | n3 | −j |
| 8 | A | N/D | N/D | N/D | n0 | −1 |
| 9 | N/D | A | A | A | n1 | −j |
| 10 | N/D | A | A | N/D | n1 | 1 |
| 11 | N/D | A | N/D | A | n1 | −j |
| 12 | N/D | A | N/D | N/D | n0 | −j |
| 13 | N/D | N/D | A | A | n2 | −j |
| 14 | N/D | N/D | A | N/D | n2 | 1 |
| 15 | N/D | N/D | N/D | A | n3 | 1 |
| 16 | N | N/D | N/D | N/D | n0 | 1 |
| 17 | D | N/D | N/D | N/D | N/A | N/A | where, in the mapping relations shown in tables 3A and 3B, numbers 1-17 denote 17 states to which the response signals correspond, A denotes that the data are correctly received, N denotes that the data are received with error, D denotes that no downlink control data is received, n0-n3 denote the available resources, that is, resources available for selection and N/A denotes being unapplicable; wherein A=ACK, N=NACK, and D=DTX. NACK and DTX are not differentiated in tables 3A and 3B. Taken state 4 (A,A,N/D, N/D) as an example, the response signals that are contained may be:

(A,A,N,N), (A,A,N,D), (A,A,D,N), (A,A,D,D).

It can be seen from above that in each of the states available for selection except for states 16 and 17, the serial numbers of the response signals to which A corresponds are consistent with the serial numbers of the resources to which the A corresponds. For example, for state 10, the serial numbers of the response signals to which A corresponds are 1 and 2, correspondingly, the serial numbers of available resources are also 1 and 2.

Furthermore, for state 16, as only the first response signal is a fixed N, the first resource can only be selected as the selected resource. States 16 and 17 may be combined into a state (N/D,N/D,N/D,N/D), in which no resource is selected for mapping it.

Second, the number of the response signals is 3 bits.

Following cases are included when the number of the response signals is 3 bits:

1) 2 CCs are configured for the mobile station, the transmission mode configured in one of the CCs containing 2 TBs, and the transmission mode configured in the other CC containing 1 TB; and 2) 3 CCs are configured for the mobile station, the transmission mode configured in each of the CCs containing 1 TB.

In these cases, the number of the resources available for selection, i.e. the number of the available resources, is 3; the relation between the state of the response signals of the mobile station and the available resources is as shown in Table 4A, in which the resources available for selection are one or more of the available resources; and for response signals with 3 bits, the mapping relation between the state of the response signals and the selected resources and the modulation symbols is as shown in Table 4B, in which the resources available for selection are one of the available resources (selectable resources).

TABLE 4A

Available resources for response signals with 3 bits

| No. | R0 | R1 | R2 | Available resources |
|---|---|---|---|---|
| 1 | A | A | A | n0, n1, n2 |
| 2 | A | A | N/D | n0, n1 |
| 3 | A | N/D | A | n0, n2 |
| 4 | A | N/D | N/D | n0 |
| 5 | N/D | A | A | n1, n2 |
| 6 | N/D | A | N/D | n1 |
| 7 | N/D | N/D | A | n2 |
| 8 | N | N/D | N/D | n0 |
| 9 | D | N/D | N/D | N/A |

TABLE 4B

Mapping relation of response signals with 3 bits

| No. | R0 | R1 | R2 | Selected Resources | Modulation symbols |
|---|---|---|---|---|---|
| 1 | A | A | A | n2 | −1 |
| 2 | A | A | N/D | n1 | −j |
| 3 | A | N/D | A | n0 | j |
| 4 | A | N/D | N/D | n0 | −1 |
| 5 | N/D | A | A | n1 | 1 |
| 6 | N/D | A | N/D | n1 | j |
| 7 | N/D | N/D | A | n2 | 1 |
| 8 | N | N/D | N/D | n0 | 1 |
| 9 | D | N/D | N/D | N/A | N/A | where, in the mapping relations shown in tables 4A and 4B, numbers 1-9 denote the states to which the response signals correspond, A denotes that the data are correctly received, N denotes that the data are received with error, D denotes that no downlink control data is received, n0-n2 denote the available resources, that is, resources available for selection and N/A denotes being unapplicable.

Third, the number of the response signals is 2 bits

Two CCs are configured for the mobile station, the transmission mode configured in each of the CCs containing 1 TB.

In this case, the number of the resources available for selection, i.e. the number of the available resources, is 2; the relation between the state of the response signals of the mobile station and the available resources is as shown in Table 5A, in which the resources available for selection are one or more of the available resources; and for 2 bits of response signals, the mapping relation between the state of the response signals and the selected resources and the modulation symbols is as shown in Table 5B, in which the resources available for selection are one of the available resources (selectable resources).

TABLE 5A

Available resources for response signals with 2 bits

| No. | R0 | R1 | Available resources |
|---|---|---|---|
| 1 | A | A | n0, n1 |
| 2 | A | N/D | n0 |
| 3 | N/D | A | n1 |
| 4 | N | N/D | n0 |
| 5 | D | N/D | N/A |

TABLE 5B

Mapping relation of response signals with 2 bits

| No. | R0 | R1 | Available Resources | Modulation symbols |
|---|---|---|---|---|
| 1 | A | A | n1 | −j |
| 2 | A | N/D | n0 | −1 |
| 3 | N/D | A | n1 | j |
| 4 | N | N/D | n0 | 1 |
| 7 | D | N/D | N/A | N/A | where, in the mapping relations shown in tables 5A and 5B, numbers 1-5 denote the states to which the response signals correspond, A denotes that the data are correctly received, N denotes that the data are received with error, D denotes that no downlink control data is received, n0-n2 denote the available resources, i.e. resources available for selection, and N/A denotes being unapplicable.

Furthermore, in this embodiment, in steps 603 and 605, the manner below may be used in selecting the uplink resources for transmitting the response signals by using the available resources:

selecting the uplink resources for transmitting the response signals and the modulation symbols by using a preconfigured mapping relation between the state of the response signals and the selected resources and the modulation symbols according to the state of the response signals; wherein a selected resource is one of the available resources;

wherein in the mapping relation, the resource corresponding to the response signal that is N/D is not selected; N and D are not differentiated, where N represents data is received with error, and D represents no downlink control data is received; and when the response signals are all N/D, no resource is selected.

In addition, no matter how many CCs are configured for the mobile station, if the downlink data are only transmitted in the PCC, the mapping needs to be performed by using resource mapping scheme in LTE, i.e. the lowest CCE index of the PDCCH in the PCC.

Following description is give for mapping relations of response signals with 4 bits and configured with 2CCs, 3CCs and 4 CCs and for mapping relations of response signals with 3 bits and configured with 2CCs and 3CCs.

First, response signals with 4 bits

When the response signals are 4 bits, and the mobile station is configured with 2 CCs, with the transmission mode configured in each of the CCs containing 2 TBs, the resources available for selection by the mobile station is as shown in Table 6A, and the mapping relation is as shown in Table 6B.

TABLE 6A

Resources available for selection by response signals with 4 bits and configured with 2 CCs

| No. | CC1, R0 | CC1, R1 | CC2, R2 | CC2, R3 | Available resources |
|---|---|---|---|---|---|
| 1  | A   | A   | A   | A   | n1, n2, n3 |
| 2  | A   | A   | A   | N   | n1, n2 |
| 3  | A   | A   | N   | A   | n1, n2, n3 |
| 4  | A   | A   | N/D | N/D | n0 |
| 5  | A   | N   | A   | A   | n2, n3 |
| 6  | A   | N   | A   | N   | n2 |
| 7  | A   | N   | N   | A   | n2, n3 |
| 8  | A   | N   | N/D | N/D | n0 |
| 9  | N   | A   | A   | A   | n1, n2, n3 |
| 10 | N   | A   | A   | N   | n1, n2 |
| 11 | N   | A   | N   | A   | n1, n2, n3 |
| 12 | N   | A   | N/D | N/D | n0 |
| 13 | N/D | N/D | A   | A   | n2, n3 |
| 14 | N/D | N/D | A   | N   | n2 |
| 15 | N/D | N/D | N   | A   | n2, n3 |
| 16 | N   | N   | N/D | N/D | n0 |
| 17 | D   | D   | N/D | N/D | N/A |

In the mapping relation shown in Table 6A, the resource corresponding to the response signal that is N/D is not selected, and when a second response signal belonging to the same CC is N, the resource corresponding to the response signal that is N is not selected. This is for the consideration of the following: if the CC is configured with 2 TBs, only one of the TBs is used for transmission actually, and the second response signal is fixedly set to be NACK, that is, this NACK has no corresponding resource.

In addition, if the CC1 in Table 6A is a PCC, for following the above principle, the first CCE index of the PDCCH of the PCC, i.e. n0, must be selected in columns 4, 8, 12 and 16 in Table 6A, to perform resource mapping, and n0 is no longer used as a selected resource for the states of other response signals.

TABLE 6B

Mapping relation of response signals with 4 bits and configured with 2 CCs

| No. | CC1, R0 | CC1, R1 | CC2, R2 | CC2, R3 | Available resources | Modulation symbols |
|---|---|---|---|---|---|---|
| 1 | A | A | A | A | n3 | −1 |
| 2 | A | A | A | N | n1 | −1 |
| 3 | A | A | N | A | n3 | j |
| 4 | A | A | N/D | N/D | n0 | −1 |
| 5 | A | N | A | A | n3 | 1 |
| 6 | A | N | A | N | n2 | 1 |
| 7 | A | N | N | A | n1 | 1 |
| 8 | A | N | N/D | N/D | n0 | j |

TABLE 6B-continued

Mapping relation of response signals with 4 bits and configured with 2 CCs

| No. | CC1, R0 | CC1, R1 | CC2, R2 | CC2, R3 | Available resources | Modulation symbols |
|---|---|---|---|---|---|---|
| 9  | N   | A   | A   | A   | n3 | −j |
| 10 | N   | A   | A   | N   | n1 | j  |
| 11 | N   | A   | N   | A   | n1 | −j |
| 12 | N   | A   | N/D | N/D | n0 | −j |
| 13 | N/D | N/D | A   | A   | n2 | −1 |
| 14 | N/D | N/D | A   | N   | n2 | j  |
| 15 | N/D | N/D | N   | A   | n2 | −j |
| 16 | N   | N   | N/D | N/D | n0 | 1  |
| 17 | D   | D   | N/D | N/D | N/A | N/A | where, in the mapping relations shown in tables 6A and 6B, numbers 1-17 denote the states to which the response signals correspond, A denotes that the data are correctly received, N denotes that the data are received with error, D denotes that no downlink control data is received, n0-n3 denote the available resources, i.e. resources available for selection, and N/A denotes being unapplicable.

Second, response signals with 4 bits

When the response signals are 4 bits, and the mobile station is configured with 3 CCs, with the transmission mode configured in one of the CCs containing 2 TBs and the transmission mode configured in the other two CCs containing 1 TB, the resources available for selection by the mobile station is as shown in Table 7A, and the mapping relation is as shown in Table 7B.

TABLE 7A

Resources available for selection by response signals with 4 bits

| No. | CC1, R0 | CC1, R1 | CC2, R2 | CC3, R3 | Available resources |
|---|---|---|---|---|---|
| 1  | A   | A   | A   | A   | n1, n2, n3 |
| 2  | A   | A   | A   | N/D | n1 |
| 3  | A   | A   | N/D | A   | n1, n3 |
| 4  | A   | A   | N/D | N/D | n0 |
| 5  | A   | N   | A   | A   | n2, n3 |
| 6  | A   | N   | A   | N/D | n2 |
| 7  | A   | N   | N/D | A   | n3 |
| 8  | A   | N   | N/D | N/D | n0 |
| 9  | N   | A   | A   | A   | n1, n2, n3 |
| 10 | N   | A   | A   | N/D | n1 |
| 11 | N   | A   | N/D | A   | n1, n3 |
| 12 | N   | A   | N/D | N/D | n0 |
| 13 | N/D | N/D | A   | A   | n2, n3 |
| 14 | N/D | N/D | A   | N/D | n2 |
| 15 | N/D | N/D | N/D | A   | n3 |
| 16 | N   | N   | N/D | N/D | n0 |
| 17 | D   | D   | N/D | N   | n3 |
| 18 | D   | D   | N/D | D   | N/A |

In the mapping relation shown in Table 7A, the resource corresponding to the response signal that is N/D is not selected, and when a second response signal belonging to the same CC is N, the resource corresponding to the response signal that is N is not selected. This is for the consideration of the following: if the CC is configured with 2 TBs, but only one of the TBs is used for transmission actually, and the second response signal is set to be NACK, that is, this NACK has no corresponding resource.

In addition, if the PCC contains 2 TBs, the CC1 in Table 7A is a PCC, for following the above principle, the first CCE index of the PDCCH of the PCC, i.e. n0, must be selected in columns 4, 8, 12 and 16 in Table 6A, to perform resource mapping, and n0 is no longer used as a selected resource for the states of other response signals.

And if the PCC contains 1 TB, the CC3 in Table 7A is a PCC, for following the above principle, a state 17, i.e. (D,D,N/D,N), is newly added into Table 7A, and the first CCE index of the PDCCH of the PCC for transmitting this TB, i.e. n3, is used to perform resource mapping for this newly added state, together with state 15.

TABLE 7B

Mapping relation of response signals with 4 bits and configured with 3 CCs

| No. | CC1, R0 | CC1, R1 | CC2, R2 | CC3, R3 | Selected resources | Modulation symbols |
|---|---|---|---|---|---|---|
| 1 | A | A | A | A | n3 | −1 |
| 2 | A | A | A | N/D | n1 | −1 |
| 3 | A | A | N/D | A | n3 | j |
| 4 | A | A | N/D | N/D | n0 | −1 |
| 5 | A | N/D | A | A | n2 | −1 |
| 6 | A | N/D | A | N/D | n2 | j |
| 7 | A | N/D | N/D | A | n3 | −j |
| 8 | A | N/D | N/D | N/D | n0 | j |
| 9 | N/D | A | A | A | n1 | −j |
| 10 | N/D | A | A | N/D | n1 | 1 |
| 11 | N/D | A | N/D | A | n1 | −j |
| 12 | N | A | N/D | N/D | n0 | −j |
| 13 | N/D | N/D | A | A | n2 | −j |
| 14 | N/D | N/D | A | N/D | n2 | 1 |
| 15 | N/D | N/D | N/D | A | n3 | 1 |
| 16 | N | N/D | N/D | N/D | n0 | 1 |
| 17 | D | D | N/D | N | n1 | j |
| 18 | D | D | N/D | D | N/A | N/A | where, in the mapping relations shown in tables 7A and 7B, numbers 1-18 denote the states to which the response signals correspond, A denotes that the data are correctly received, N denotes that the data are received with error, D denotes that no downlink control data is received, n0-n3 denote the available resources, i.e. resources available for selection, and N/A denotes being unapplicable.

Third, 3 bits of response signals

When the response signals are 3 bits, and the mobile station is configured with 2 CCs, with the transmission mode configured in one of the CCs containing 2 TBs and the transmission mode configured in the other CC containing 1 TB, the resources available for selection by the mobile station is as shown in Table 8A, and the mapping relation is as shown in Table 8B.

TABLE 8A

Resources available for selection by response signals with 3 bits and configured with 2 CCs

| No. | CC1, R0 | CC1, R1 | CC2, R2 | Available resources |
|---|---|---|---|---|
| 1 | A | A | A | n1, n2 |
| 2 | A | A | N/D | n0 |
| 3 | A | N | A | n2 |
| 4 | A | N | N/D | n0 |
| 5 | N | A | A | n1, n2 |
| 6 | N | A | N/D | n0 |
| 7 | N/D | N/D | A | n2 |
| 8 | N | N | D | n0 |
| 9 | N/D | N/D | N | n2 |
| 10 | D | D | D | N/A |

In the mapping relation shown in Table 8A, the resource corresponding to the response signal that is N/D is not selected, and when a second response signal belonging to the same CC is N, the resource corresponding to the response signal that is N is not selected. This is for the consideration of the following: if the CC is configured with 2 TBs, but only one of the TBs is used for transmission actually, and the second response signal is fixedly set to be NACK, that is, this NACK has no corresponding resource.

In addition, if the PCC contains 2 TBs, the CC1 in Table 8A is a PCC, for following the above principle, the first CCE index of the PDCCH of the PCC, i.e. n0, must be selected in columns 2, 4, 6 and 8 in Table 8A, to perform resource mapping, and n0 is no longer used as a selected resource for the states of other response signals.

And if the PCC contains 1 TB, the CC2 in Table 8A is a PCC, for following the above principle, the first CCE index of the PDCCH of the PCC for transmitting this TB, i.e. n3, is used to perform resource mapping for states 7 and 9 in Table 8A.

TABLE 8B

Mapping relation of response signals with 3 bits and configured with 2 CCs

| No. | CC1, R0 | CC1, R1 | CC2, R2 | Available resources | Modulation symbols |
|---|---|---|---|---|---|
| 1 | A | A | N/D | n1 | −1 |
| 2 | A | A | N/D | n0 | −1 |
| 3 | A | N | A | n2 | j |
| 4 | A | N | N/D | n0 | j |
| 5 | N | A | A | n1 | 1 |
| 6 | N | A | N/D | n0 | −j |
| 7 | N/D | N/D | A | n2 | −1 |
| 8 | N | N | D | n0 | 1 |
| 9 | N/D | N/D | N | n2 | 1 |
| 10 | D | D | D | N/A | N/A | where, in the mapping relations shown in tables 8A and 8B, numbers 1-10 denote the states to which the response signals correspond, A denotes that the data are correctly received, N denotes that the data are received with error, D denotes that no downlink control data is received, n0-n2 denote the available resources, i.e. resources available for selection, and N/A denotes being unapplicable.

It can be seen from the above embodiment that in the case of insufficient resources, the base station allocates extra resource based on the number of TBs used for transmitting data, and transmits the indices of the resources to the mobile station via a PDCCH, so that the mobile station may feed back response signals by using the preconfigured resources and the extra allocated resources, and may feed back the response signals at a relatively low cost without breaking the uplink single carrier properties which solves the problem of insufficient resources in the prior art.

It should be understood by those skilled in the art that all or part of the steps in the methods of the above embodiments may be implemented by related hardware instructed by a program, and the program may be stored in a computer-readable storage medium. In executing the program, all or part of the steps in the methods of the above embodiments may be included, and the storage medium may comprise an ROM, an RAM, a floppy disk, and a compact disk, etc.

An embodiment of the present invention provides also a base station and a mobile station as described below. As the principles of the base station and the mobile station for solving problems are similar to those of the method for transmitting uplink response signal based on a base station and a mobile station as described above, the implementation of the method may be referred to for the implementation of the base station and the mobile station, and the repeated parts shall not be described further.

Figure 7:
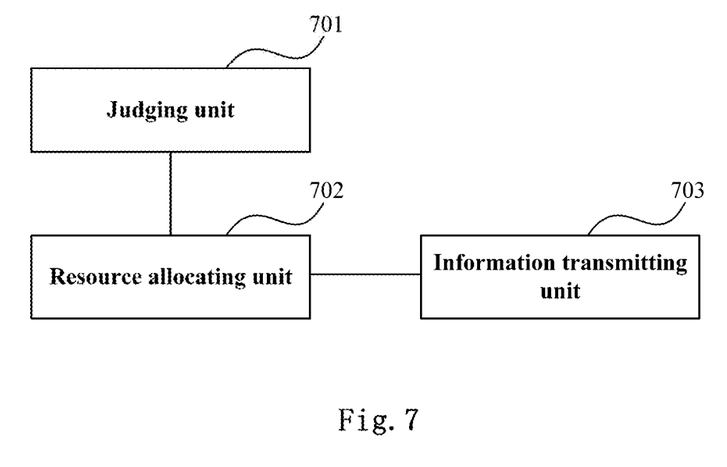
FIG. 7 is a schematic diagram of the structure of the base station in accordance with the 4th embodiment of the present invention.

FIG. 7 is a schematic diagram of the structure of the base station in accordance with the 4th embodiment of the present invention. As shown in FIG. 7, the base station comprises a judging unit 701 and a resource allocating unit 702; wherein the judging unit 701 is used for judging whether a downlink secondary component carrier is used to transmit data to a mobile station; and the resource allocating unit 702 is used for allocating resources according to the number of the transmission blocks for transmitting downlink data via the secondary component carrier if the judging result of the judging unit 701 is positive, such that the mobile station is able to use the resources corresponding to a preconfigured primary component carrier and the resources allocated to the secondary component carrier to select the uplink resources for transmitting response signals.

As shown in FIG. 7, the base station further comprises an information transmitting unit 703 for transmitting indices of the resources allocated by the resource allocating unit 702 to the mobile station. Wherein, the indices of the resources may be transmitted to the mobile station in a PDCCH scheduling data transmission. However, it is not limited thereto, and other manners may be used for transmission.

It can be seen from the above embodiment that when data are transmitted via SCCs, a case of insufficient of resources occurs. As such, the base station allocates extra resource based on the number of TBs used for transmitting data, and transmits the indices of the resources to the mobile station via a PDCCH, so that the mobile station may feed back response signals by using the preconfigured resources and the extra allocated resources, and may feed back the response signals at a relatively low cost which solves the problem of insufficient resources in the prior art.

Figure 8:
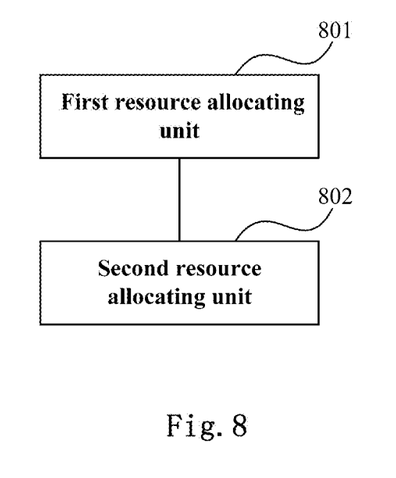
FIG. 8 is a schematic diagram of the structure of the resource allocating unit in FIG. 7.

FIG. 8 is a schematic diagram of the structure of the resource allocating unit in FIG. 7. As shown in FIG. 8, the resource allocating unit 702 comprises a first resource allocating unit 801 and a second resource allocating unit 802; wherein the first resource allocating unit 801 is used for selecting resources from a preconfigured first resource table if the number of the transmission blocks for transmitting downlink data is 1, each of the elements in the first resource table including 1 resource; and second resource allocating unit 802 is used for selecting resources from a preconfigured second resource table if the number of the transmission blocks for transmitting downlink data is 2, each of the elements in the second resource table including 2 resources.

Wherein, Table 1 and Table 2 may be referred to for the first resource table and the second resource table, which shall not be described any further.

Furthermore, the base station may comprise a storage unit (not shown) for storing the preconfigured Table 1 and Table 2. And the resources of Table 1 and Table 2 are shared by all the mobile stations. The base station may further comprise a data transmitting unit (not shown) for transmitting downlink data to the mobile station via CCs.

Figure 9:
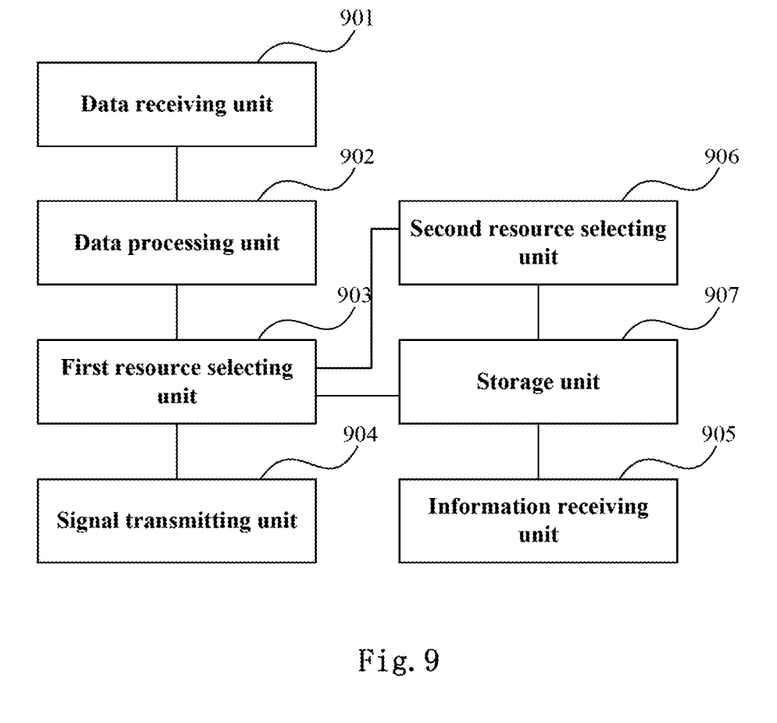
FIG. 9 is a schematic diagram of the structure of the mobile station in accordance with the 5th embodiment of the present invention.

FIG. 9 is a schematic diagram of the structure of the mobile station in accordance with the 5th embodiment of the present invention. As shown in FIG. 9, the mobile station comprises a data receiving unit 901, a data processing unit 902, a first resource selecting unit 909 and a signal transmitting unit 904; wherein the data receiving unit 901 is used for receiving the downlink data transmitted by a base station via a downlink component carrier, the data processing unit 902 is used for decoding the received downlink data, and obtaining the response signals of the downlink data according to the decoding result, the first resource selecting unit 903 is used for selecting the uplink resources for transmitting the response signals from available resources and selecting corresponding modulation symbols if the component carrier for transmitting the downlink data includes a secondary component carrier; wherein the available resources include resources corresponding to a preconfigured primary component carrier and the resources allocated to the secondary component carrier by the base station, and the signal transmitting unit 904 is used for transmitting the response signals by using the selected uplink resources and the corresponding modulation symbols.

In this embodiment, the states of the response signals are mapped by using the uplink resources and the modulation symbols in the uplink resources. In this way, the mobile station selects the uplinks resources and selects corresponding modulation symbols according to the states of the response signals. Thus, the mobile station may transmit the modulation symbols, and the base station may judge whether the transmitted downlink data are correctly received after receiving the modulation symbols. This is similar to the prior art, which shall not be described any further.

As shown in FIG. 9, the mobile station may further comprise an information receiving unit 905 for receiving the indices of the resources transmitted by the base station, the resources being allocated to the downlink secondary component carrier by the base station.

As shown in FIG. 9, the mobile station further comprises a second resource selecting unit 906 for selecting the uplink resources for transmitting the response signals and corresponding modulation symbols from the available resources if the component carrier for transmitting the downlink data is a primary component carrier; wherein the available resources include the resources corresponding to the preconfigured primary component carrier.

In the above embodiment, the first resource selecting unit 905 and the second resource selecting unit 906 are specifically used for selecting the uplink resources for transmitting the response signals and the modulation symbols by using a preconfigured mapping relation between the state of the response signals and the selected resources and the modulation symbols according to the state of the response signals; wherein a selected resource is one of the available resources.

And wherein in the mapping relation, the resource corresponding to the response signal that is N/D is not selected; N and D are not differentiated, where N represents data is received with error, and D represents no downlink control data is received; and when the response signals are all N/D, no resource is selected. Wherein, the available resources shown in tables 3A, 4A and 5A may be selected according to the state of the response signals.

Preferably, the uplink resources and the corresponding modulation symbols are selected by using the mapping relations shown in tables 3B, 4B and 5B as described above, which shall not be described any further.

Furthermore, the first resource selecting unit 905 is used to select the uplink resources for transmitting the response signals and the modulation symbols by using a preconfigured mapping relation between the state of the response signals and the selected resources and the modulation symbols according to the state of the response signals.

Wherein in the mapping relation, the resource corresponding to the response signal that is N/D is not selected; and when the second response signal belonging to the same component carrier is N, the resource corresponding to the response signal which is N is not used;

No matter how many CCs are configured for the mobile station, if the downlink data are only transmitted in the PCC, the mapping needs to be performed by using resource mapping scheme in LTE, i.e. the lowest CCE index of the PDCCH in the PCC.

Wherein, for the response signals with 4 bits and configured with 2 CCs, the available resources shown in Table 6A may be used, and uplink resource selection may performed preferably by using the mapping relations shown in Table 6B; for the response signals with 4 bits and configured with 3 CCs, the available resources shown in Table 7A may be used, and uplink resource selection may performed preferably by using the mapping relations shown in Table 7B; and for the response signals with 3 bits and configured with 2 CCs, the available resources shown in Table 8A may be used, and uplink resource selection may performed preferably by using the mapping relations shown in Table 8B.

Furthermore, the mobile station may comprise a storage unit 907 for storing the preconfigured resources, the allocated resources and the above tables of mapping relation.

It can be seen from the above embodiment that when data are transmitted via SCCs, a case of insufficient of resources occurs. As such, the base station allocates extra resource based on the number of TBs used for transmitting data, and transmits the indices of the resources to the mobile station via a PDCCH, so that the mobile station may feed back response signals by using the preconfigured resources and the extra allocated resources, and may feed back the response signals at a relatively low cost which solves the problem of insufficient resources in the prior art.

Figure 10:
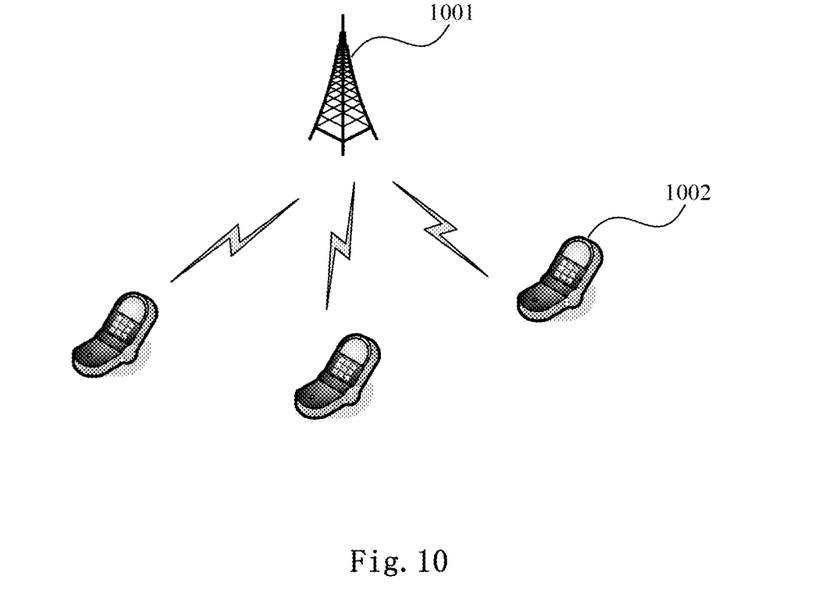
FIG. 10 is a schematic diagram of the structure of the communication system in accordance with the 6th embodiment of the present invention.

FIG. 10 is a schematic diagram of the structure of the communication system in accordance with the 6th embodiment of the present invention. As shown in FIG. 10, the communication system comprises a base station 1001 and a mobile station 1002; wherein the base station 1001 may use the base station as described in the 4th embodiment, and the mobile station 1002 may use the mobile station as described in the 5th embodiment, which shall not be described any further.

It can be seen from the above embodiment that when data are transmitted by the base station via SCCs, a case of insufficient of resources occurs. As such, the base station allocates extra resource based on the number of TBs used for transmitting data, and transmits the indices of the resources to the mobile station via a PDCCH, so that the mobile station may feed back response signals by using the preconfigured resources and the extra allocated resources, and may feed back the response signals at a relatively low cost which solves the problem of insufficient resources in the prior art.

An embodiment of the present invention further provides a computer-readable program, wherein when the program is executed in a base station, the program enables a computer to carry out the method for transmitting uplink response signals as described in the 1st or 2nd embodiment in the base station.

An embodiment of the present invention further provides a storage medium storing a computer-readable program, wherein the computer-readable program enables a computer to carry out the method for transmitting uplink response signals as described in the 1st or 2nd embodiment in a base station.

An embodiment of the present invention further provides a computer-readable program, wherein when the program is executed in a mobile station, the program makes a computer to carry out the method for transmitting uplink response signals as described in the 3rd embodiment in the mobile station.

An embodiment of the present invention further provides a storage medium storing a computer-readable program, wherein the computer-readable program enables a computer to carry out the method for transmitting uplink response signals as described in the 3rd embodiment in a mobile station.

The above devices and methods of the present invention may be implemented by hardware, and may also be implemented by hardware in combination with software. The present invention relates to such a computer-readable program that when the program is executed by a logic component, it enables the logic component to implement the devices or constitutional parts as described above, or enables the logic component to implement the methods or steps as described above. The present invention relates also to a storage medium for storing the above program, such as a hard disk, a floppy disk, a CD, and flash memory, etc.

The present invention are described above in conjunction with the embodiments, however, it will be apparent to those skilled in the art that such description is exemplary only and is not limitative to the protection scope of the present invention. Various variations and modifications may be made by those skilled in the art without departing from the spirits and principle of the present invention, which will fall within the protection scope of the present invention.

What is claimed is:

1. A user equipment (UE), comprising:
   a receiver configured to receive downlink data transmitted by a base station via downlink component carriers including a secondary component carrier; and
   a circuit configured to select uplink resources from available resources for transmitting response signals obtained by decoding the received downlink data and select corresponding modulation symbols by using a mapping relation between a state of the response signals and the selected resources and the modulation symbols according to the state of the response signals;
   wherein the available resources include resources corresponding to a primary component carrier and resources allocated to the secondary component carrier by the base station; and,
   wherein the mapping relation includes cases in which the resource corresponding to the response signal that is NACK/DTX is not selected; where NACK represents Negative Acknowledgement, and DTX represents Discontinuous Transmission; and when the response signals are all DTX, no resource is selected.

2. A method used by a user equipment (UE), comprising:
   receiving downlink data transmitted by a base station via downlink component carriers including a secondary component carrier;
   selecting uplink resources from available resources for transmitting response signals obtained by decoding the received downlink data and corresponding modulation symbols by using a mapping relation between a state of the response signals and the selected resources and the modulation symbols according to the state of the response signals; and
   transmitting the response signals by using the selected uplink resources and the corresponding modulation symbols;
   wherein the available resources include resources corresponding to a primary component carrier and resources allocated to the secondary component carrier by the base station; and,
   wherein the mapping relation includes cases in which the resource corresponding to the response signal that is NACK/DTX is not selected; where NACK represents Negative Acknowledgement, and DTX represents Discontinuous Transmission; and when the response signals are all DTX, no resource is selected.

* * * * *